United States Patent [19]
Cox

[11] Patent Number: 5,444,991
[45] Date of Patent: Aug. 29, 1995

[54] ENGINE COOLING APPARATUS

[76] Inventor: William L. Cox, 222-14 133rd Ave., Jamaica, N.Y. 11413

[21] Appl. No.: 55,272

[22] Filed: May 3, 1993

[51] Int. Cl.⁶ .................. F24F 13/00; F25B 39/04
[52] U.S. Cl. ..................... 62/305; 62/323.1; 62/239; 239/124; 261/DIG. 85; 261/DIG. 39; 261/DIG. 32
[58] Field of Search ............ 62/305, 323.1, 239; 261/115, DIG. 32, DIG. 39, DIG. 85; 239/120, 121, 124, 567

[56] References Cited
U.S. PATENT DOCUMENTS

| | | | |
|---|---|---|---|
| 1,639,294 | 8/1927 | Hudson | 239/121 |
| 1,843,579 | 2/1932 | Nelson | 239/121 |
| 2,103,542 | 12/1937 | Mart | 62/305 |
| 2,278,242 | 3/1942 | Chapman | 62/305 |
| 2,514,748 | 7/1950 | DiStefano | 239/121 |
| 3,926,000 | 12/1975 | Scofield | 62/121 |
| 4,494,384 | 1/1985 | Lott | 62/279 |
| 4,516,406 | 5/1985 | Gentry et al. | 62/183 |
| 4,563,840 | 1/1986 | Urakani | 51/410 |
| 5,195,334 | 3/1993 | Lang et al. | 62/305 |

*Primary Examiner*—Henry A. Bennet
*Assistant Examiner*—William C. Doerrler

[57] ABSTRACT

An engine cooling apparatus positioned between a coolant radiator and air conditioning condenser of an associated automotive vehicle, with the cooling apparatus including a plurality of nozzle members between the condenser and radiator structure, with a fluid control operative through a control relay to effect actuation of a pump to direct fluid flow to the nozzle members upon sensing a predetermined coolant temperature within the radiator.

1 Claim, 4 Drawing Sheets

FIG. I

ENGINE COOLING APPARATUS

BACKGROUND OF THE INVENTION

1. Field of the Invention

The field of invention relates to vehicular cooling apparatus, and more particularly pertains to a new and improved engine cooling apparatus wherein the same is arranged for directing spray simultaneously to a condenser and radiator unit of an associated automotive vehicle.

2. Description of the Prior Art

Cooling apparatus of various types have been utilized throughout the prior art within self propelled vehicles such as indicated in U.S. Pat. Nos. 3,428,115; 4,320,628; 4,245,481; and 4,730,662.

The instant invention attempts to overcome deficiencies of the prior art by providing for an organization arranged for ease of use as well as retrofit relative to a cooling system of an associated automotive vehicle and in this respect, the present invention substantially fulfills this need.

SUMMARY OF THE INVENTION

In view of the foregoing disadvantages inherent in the known types of engine cooling apparatus now present in the prior art, the present invention provides an engine cooling apparatus wherein the same is arranged to provide for nozzle members to direct spray simultaneously to a radiator and air condition condenser unit of an associated automotive vehicle. As such, the general purpose of the present invention, which will be described subsequently in greater detail, is to provide a new and improved engine cooling apparatus which has all the advantages of the prior art engine cooling apparatus and none of the disadvantages.

To attain this, the present invention provides an engine cooling apparatus positioned between a coolant radiator and air conditioning condenser of an associated automotive vehicle, with the cooling apparatus including a plurality of nozzle members between the condenser and radiator structure, with a fluid control operative through a control relay to effect actuation of a pump to direct fluid flow to the nozzle members upon attaining a predetermined coolant temperature within the radiator.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved engine cooling apparatus which has all the advantages of the prior art engine cooling apparatus and none of the disadvantages.

It is another object of the present invention to provide a new and improved engine cooling apparatus which may be easily and efficiently manufactured and marketed.

It is a further object of the present invention to provide a new and improved engine cooling apparatus which is of a durable and reliable construction.

An even further object of the present invention is to provide a new and improved engine cooling apparatus which is susceptible of a low cost of manufacture with regard to both materials and labor and which accordingly is then susceptible of low prices of sale to the consuming public, thereby making such engine cooling apparatus economically available to the buying public.

Still yet another object of the present invention is to provide a new and improved engine cooling apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
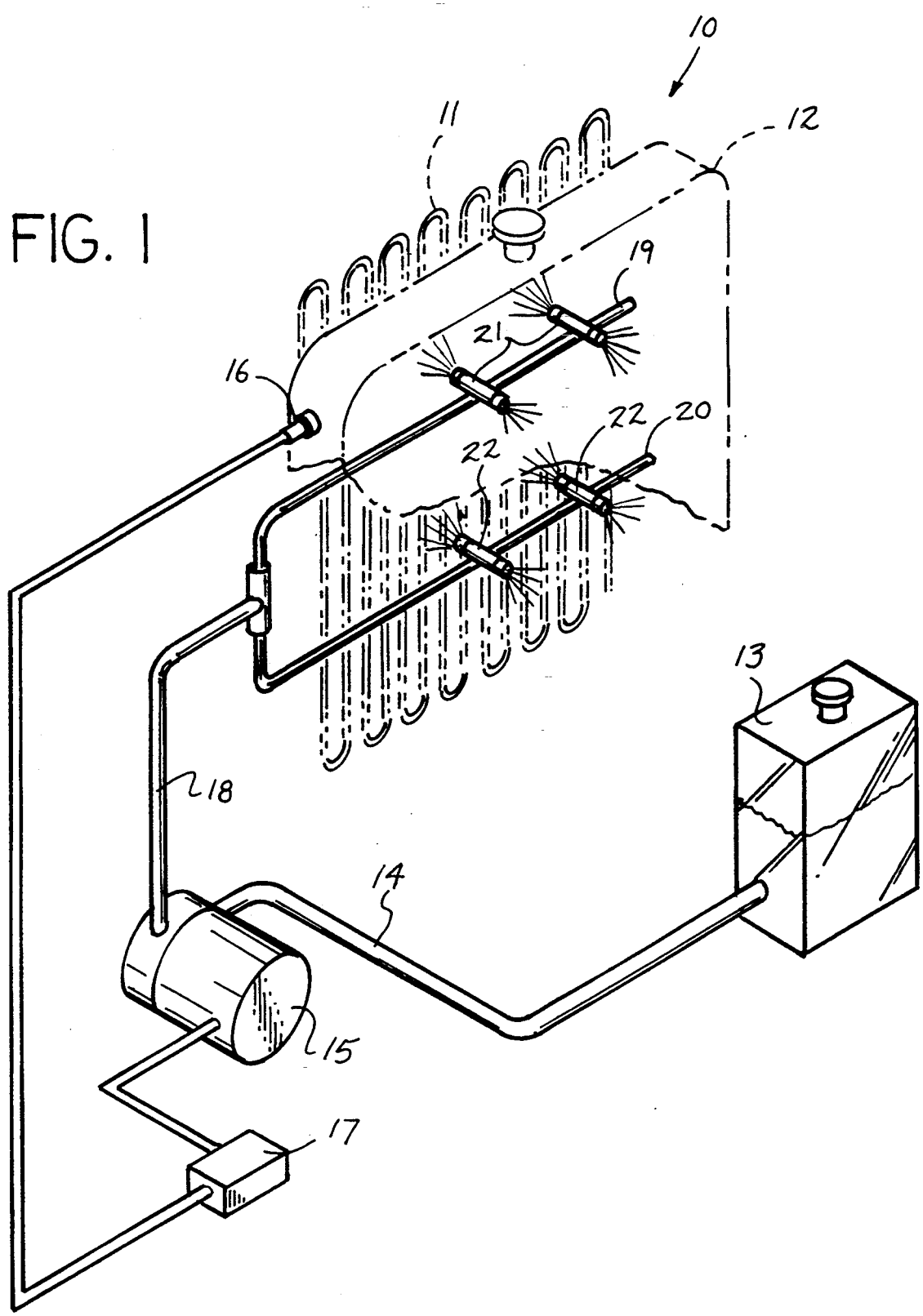
FIG. 1 is an isometric illustration of the invention.
Figure 2:
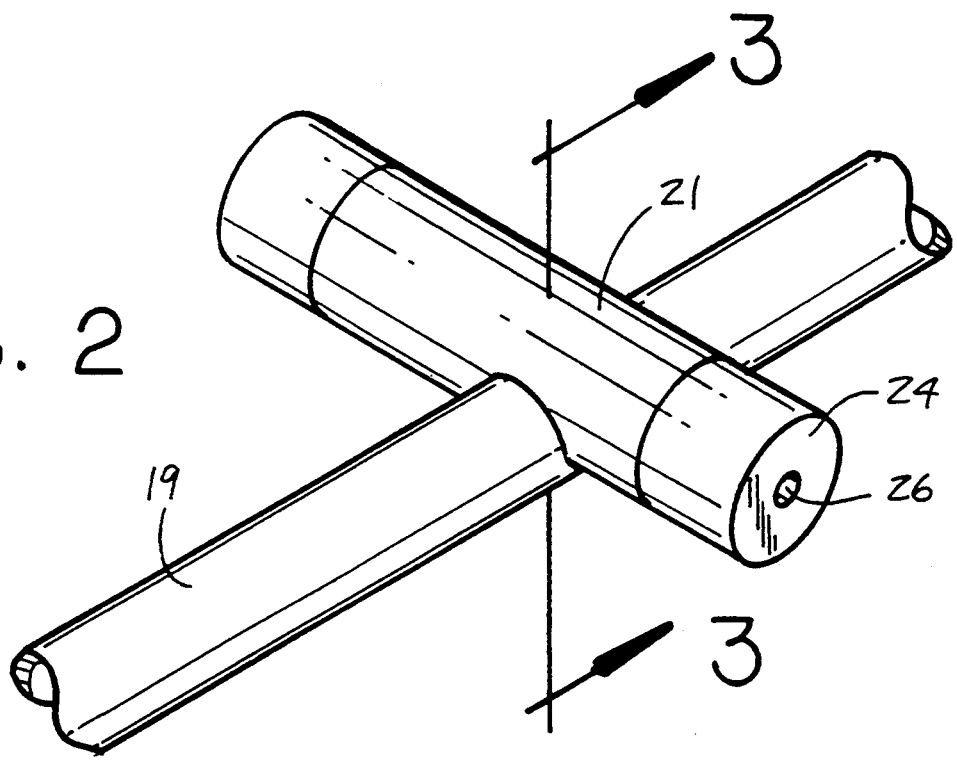
FIG. 2 is an isometric illustration of an individual nozzle member.
Figure 3:
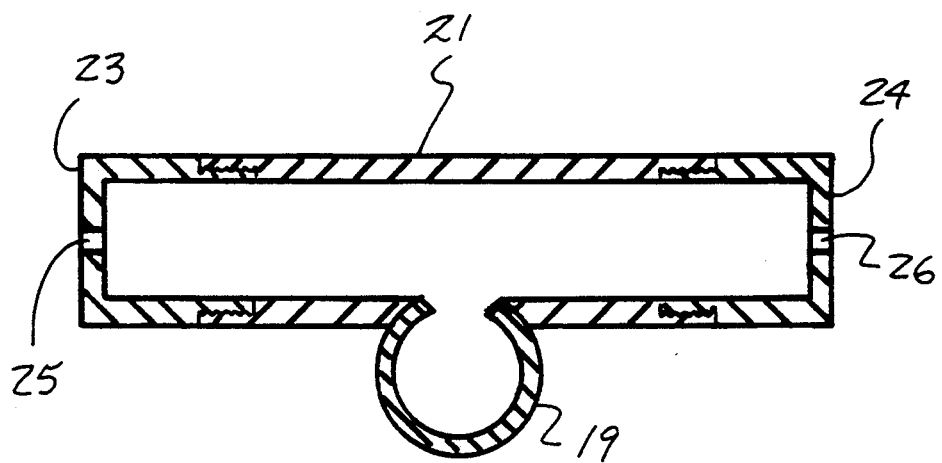
FIG. 3 is an orthographic view, taken along the lines 3—3 of FIG. 2 in the direction indicated by the arrows.

With reference now to the drawings, and in particular to FIGS. 1 to 7 thereof, a new and improved engine cooling apparatus embodying the principles and concepts of the present invention and generally designated by the reference numeral 10 will be described.

More specifically, the engine cooling apparatus 10 of the instant invention essentially comprises the use of a plurality of rows of fluid delivery nozzle members positioned between condenser panel 11 and radiator 12 of conventional construction. A reservoir container 13 is provided in fluid communication with a fluid pump 15 through a first fluid delivery conduit 14. A temperature sensor 16 is directed into the radiator 12 to detect coolant temperature with sensor 16 in electrical communication with a control unit relay 17 of the fluid pump 15. Upon temperature sensing by the temperature sensor 16 reaching a predetermined temperature, fluid is directed from the fluid pump 15 under pressure to a junction that in turn directs fluid to respective first and second fluid supply conduits 19 and 20 that are directed between the condenser panel 11 and the radiator 12, in a manner as indicated in FIG. 1. The first fluid supply conduit 19 includes a plurality of first nozzle members 21 orthogonally oriented between the condenser panel 11 and radiator 12 as are the second nozzle members 22 of the second fluid supply conduit 20. It should be noted, the first and second fluid supply conduits 19 and 20 are oriented a parallel relationship relative to one another between the condenser panel 11 and the radiator 12 such that each of the nozzle members 21 and 22 includes respective first and second nozzle ends 23 and 24 having respective first and second outlet ports 25 and 26 to project fluid respectively to the radiator 12 and the condenser panel 11 upon actuation of the fluid pump 15 directing water supply to the nozzle members. It should be understood that the nozzle members 21 and 22 are of identical construction and the first and second nozzles ends 23 and 24 of identical construction.

Figure 4:
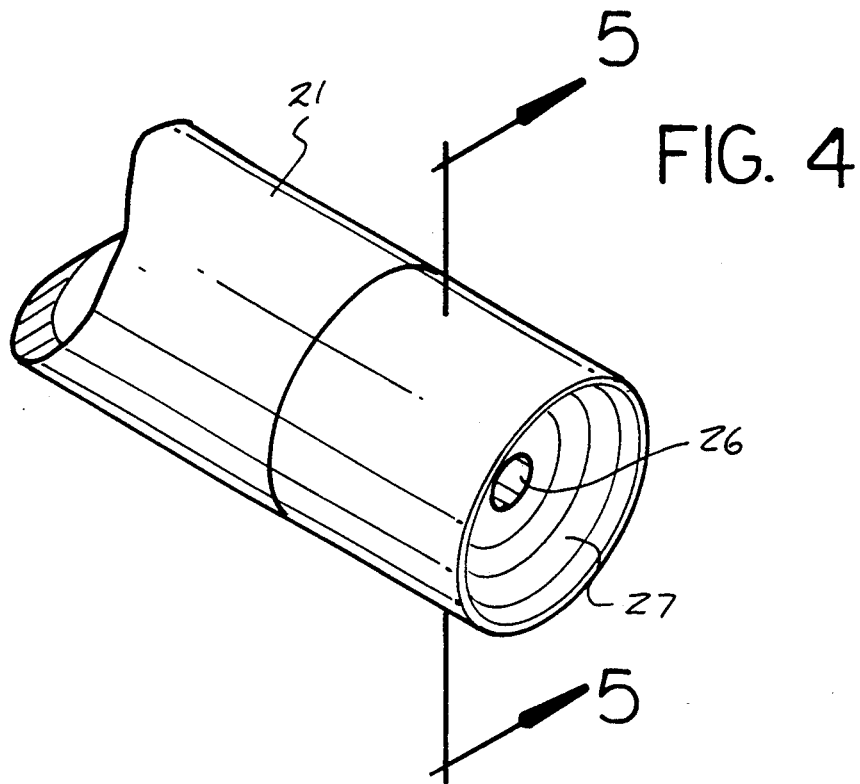
FIG. 4 is an isometric illustration of a modified nozzle member end face.
Figure 5:
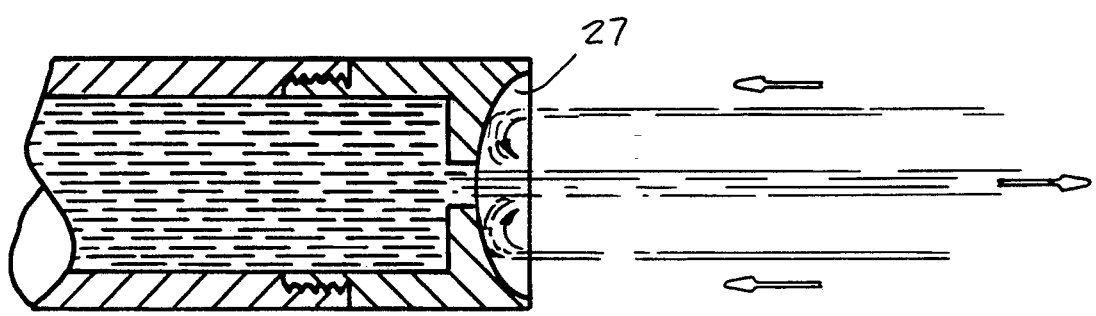
FIG. 5 is an orthographic view, taken along the lines 5—5 of FIG. 4 in the direction indicated by the arrows.

Further, the FIGS. 4 and 5 indicates the use of each end of each nozzle member having a concave end wall with a respective outlet port 25 or 26 medially of a respective concave end wall to receive reflected water and to thereby effect recirculation of deflected water from the associated condenser and radiator members.

Figure 6:
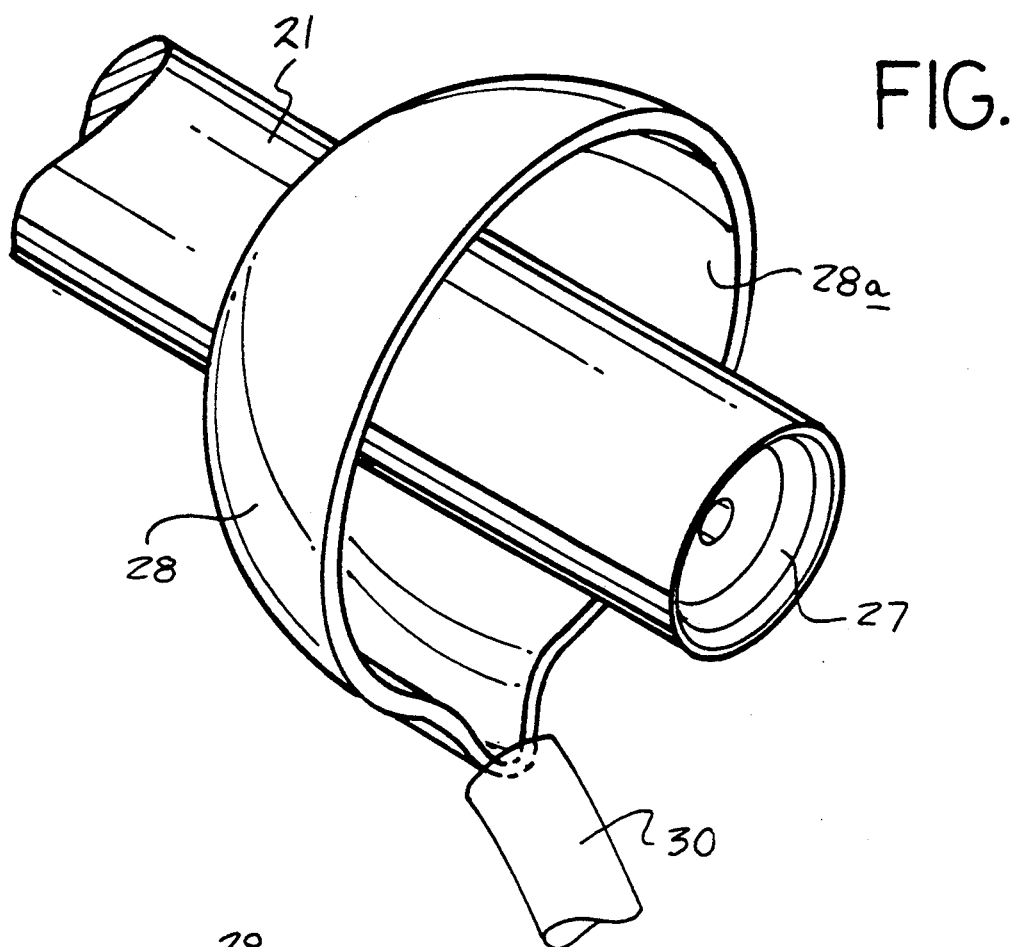
FIG. 6 is an isometric illustration of a further modified nozzle member.
Figure 7:
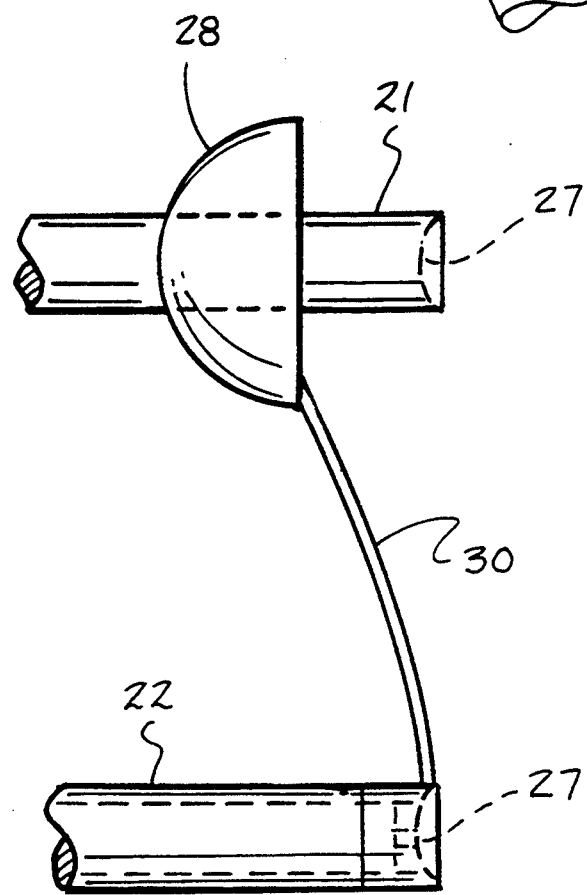
FIG. 7 is an orthographic side view of the modified nozzle structure in cooperation with an underlying nozzle member.

Further, the FIGS. 6 and 7 indicates that each of the nozzle members 21 include in a spaced adjacency to each of the ends, a deflection cup 28 having a concave cup interior surface 28a coaxially aligned relative to its respective nozzle member directed to a nozzle member 21 end. The concave surface 28a receives deflected water therewithin and as the deflection cup 28 includes a pour spout 29 at a lowermost end oriented between a first nozzle member 21 and a second nozzle member 22, an overflow conduit 30 directed from the pour spout 29 directs fluid flow from the deflection cup 28 to the concave end wall 27 of an adjacent and underlying second nozzle member 22.

As to the manner of usage and operation of the instant invention, the same should be apparent from the above disclosure, and accordingly no further discussion relative to the manner of usage and operation of tile instant invention shall be provided.

With respect to the above description then, it is to be realized that the optimum dimensional relationships for the parts of the invention to include variations in size, materials, shape, form, function and manner of operation, assembly and use, are deemed readily apparent and obvious to one skilled in the art, and all equivalent relationships to those illustrated in the drawings and described in the specification are intended to be encompassed by tile present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

What is claimed as being new and desired to be protected by LETTERS PATENT of the United States is as follows:

1. An engine cooling apparatus comprising in combination, a condenser panel, and a cooling radiator, with the apparatus further including a reservoir container, and a fluid pump, with a first fluid delivery conduit arranged in fluid communication with the reservoir container and the fluid pump, and a second fluid delivery conduit arranged in fluid communication between the fluid pump directing fluid from the fluid pump, and the second fluid delivery conduit including a first fluid supply conduit and a second fluid supply conduit extending from the second fluid delivery conduit, with the first fluid supply conduit and the second fluid supply conduit extending between the condenser panel and the radiator, and a temperature sensor mounted into the radiator, and a control unit in operative communication with the temperature sensor, and the control unit arranged in operative communication with the fluid pump to effect actuation of the fluid pump upon the temperature sensor detecting a predetermined elevated temperature within the radiator, and the first fluid supply conduit includes a plurality of first nozzle members, and the second fluid supply conduit includes a plurality of second nozzle members, with each of the first nozzle members and each of the second nozzle members including a first nozzle end and a second nozzle end, with the first nozzle end arranged in facing relationship relative to the radiator, and each of the second nozzle ends arranged in facing relationship relative to the condenser panel, and the first nozzle end includes a first outlet port, and the second nozzle end includes a second outlet port, and the first nozzle end and the second nozzle end are of a concave configuration, and the first nozzle members each include a plurality of deflection cups, with each deflection cup of said deflection cups positioned in adjacency relative to one of said nozzle ends of said first nozzle end and said second nozzle end, and the deflection cup including a concave surface and a pour spout oriented between the first nozzle members and the second nozzle members, and each pour spout having an overflow conduit arranged in fluid communication between the pour spout and a second nozzle member nozzle end of said first nozzle end and said second nozzle end.

* * * * *